(12) United States Patent
Alamri et al.

(10) Patent No.: US 11,407,850 B2
(45) Date of Patent: Aug. 9, 2022

(54) CROSS-LINKED POLYMERIC MATERIALS AND ARTICLES

(71) Applicant: Saudi Arabian Oil Company, Dhahran (SA)

(72) Inventors: Haleema Alamri, Alkhobar (SA); Maryah Almaghrabi, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 239 days.

(21) Appl. No.: 16/991,156

(22) Filed: Aug. 12, 2020

(65) Prior Publication Data
US 2022/0049041 A1 Feb. 17, 2022

(51) Int. Cl.
| | |
|---|---|
| *C08F 299/04* | (2006.01) |
| *C08F 255/02* | (2006.01) |
| *C08F 299/02* | (2006.01) |
| *C08K 5/05* | (2006.01) |
| *C08K 5/5399* | (2006.01) |
| *C08L 67/04* | (2006.01) |

(52) U.S. Cl.
CPC .......... *C08F 299/04* (2013.01); *C08F 255/02* (2013.01); *C08F 299/024* (2013.01); *C08K 5/05* (2013.01); *C08K 5/5399* (2013.01); *C08L 67/04* (2013.01)

(58) Field of Classification Search
CPC ....... C08F 255/02; C08L 33/068; C08L 67/04
See application file for complete search history.

(56) References Cited

U.S. PATENT DOCUMENTS

2018/0179368 A1  6/2018  Jasinska-Walc et al.

FOREIGN PATENT DOCUMENTS

| CN | 106349976 | A |   | 1/2017 |   |
|---|---|---|---|---|---|
| CN | 107603211 | A |   | 1/2018 |   |
| EP |   1790694 | A1 | * | 5/2007 | ........... B29C 61/003 |
| WO | 2016097207 | A1 |   | 6/2016 |   |
| WO | 2019099944 | A1 |   | 5/2019 |   |

OTHER PUBLICATIONS

Badji et al., "The Effect of Poly-Ethylene-co-Glycidyl Methacrylate Efficiency and Clay Platelets on Thermal and Rheological Properties of Wood Polyethylene Composites", Advances in Chemical Engineering and Science, vol. 6, pp. 436-455, 2016.
Demongeot et al., "Cross-Linking of Poly(butylene terephthalate) by Reactive Extrusion Using Zn(II) Epoxy-Vitrimer Chemistry", Macromolecules, American Chemical Society, vol. 50(16), pp. 6117-6127, 2017.
Liu et al., "Eugenol-Derived Biobased Epoxy: Shape Memory, Repairing, and Recyclability", Macromolecules, American Chemical Society, vol. 50, pp. 8588-8597, 2017.
Rottger et al., "High-performance vitrimers from commodity thermoplastics through dioxaborolane methathesis", Science, vol. 356, pp. 62-65, Apr. 7, 2017.
Snyder et al., "Reprocessable Acid-Degradable Polycarbonate Vitrimers", Macromolecules, American Chemical Society, vol. 51, pp. 389-397, 2018.
Witt et al., "Large-ring lactones from plan oils", RSC Publishing, Green Chemistry, vol. 15, No. 9, pp. 2361-2364, 2013.
Yang et al., "A fully bio-based epoxy vitrimer: Self-healing, triple-shape memory and reprocessing triggered by dynamic covalent bond exchange", Materials and Design, vol. 186, 10 pages, 2020.
Zhang et al., "Effects of Compatibilizers on Selected Properties of HDPE Composites Highly Filled with Banboo Flour", Wood and Fiber Science, vol. 50(3), Jul. 2018.
International Search Report and Written Opinion dated Nov. 22, 2021 pertaining to International application No. PCT/US2021/045336 filed Aug. 10, 2021, 12 pages.

* cited by examiner

*Primary Examiner* — Mark S Kaucher
(74) *Attorney, Agent, or Firm* — Dinsmore & Shohl LLP

(57) ABSTRACT

Reprocessable materials are provided that include a product of cross-linking a glycidyl methacrylate grafted high-density polyethylene (HDPE-g-GMA) with a polymacrolactone of formula (II) to form a cross-linked polymer exhibiting vitrimer characteristics. Methods for preparing the cross-linked polymer materials include reacting the glycidyl methacrylate grafted high-density polyethylene of with the polymacrolactone in the presence of a first catalyst under conditions that initiate cross-linking of HDPE-g-GMA with the polymacrolactone. Mechanically reprocessable articles include a structural element that is or includes the cross-linked polymer material. Examples of the mechanically reprocessable articles include pallets or molded structures formed from the material and configured to support a load of at least 1000 kg without bending.

19 Claims, No Drawings

CROSS-LINKED POLYMERIC MATERIALS AND ARTICLES

TECHNICAL FIELD

The present disclosure relates generally to cross-linked polymeric materials and more specifically to vitrimer materials, synthesis of the vitrimer materials, and articles including the vitrimer materials as structural components.

BACKGROUND

Modern industry constantly seeks materials that satisfy needs for long-term mechanical strength and durability. From an ecological perspective, maximum lifetime, as well as ability to reuse or recycle materials from structural applications, are highly desirable. Structural applications may include a variety of implementations, from building materials for livable structures to containers for objects or liquids.

One example of a structural application includes industrial pallets. Industrial pallets are common worldwide, especially in warehouses and in the shipping industry, for supporting or transporting goods in a stable manner. Typical pallets include features that enable the pallet and the goods supported by the pallet to be moved by heavy equipment such as forklifts or cranes. Pallets are available in numerous shapes and sizes and have been made from various materials, including wood, plastic, or metal, for example. Each of these classes of materials may have benefits in set applications, but no versatile material has been developed for industrial pallets that can be implemented in multiple applications while being highly durable and recyclable.

As is particularly relevant to plastics that are intended for applications in which heavy loads must be supported by a structure made of the plastics, it is well understood that recycling of plastics inevitably results in a decrease of mechanical strength of the second and subsequent generations of the plastics. In turn, benefits from increases to mechanical strength in plastics are typically counterbalanced by diminished ability to recycle or reuse the plastics for the same application. Accordingly, in the field of structural materials, including but by no means limited to industrial pallets, there are ongoing needs for polymer materials that exhibit both high mechanical strength for supporting heavy loads, for example, and ability to be recycled and reused without substantial reduction in the mechanical strength.

SUMMARY

Against the foregoing background, embodiments of this disclosure are directed to cross-linked polymeric materials belonging to a class of vitrimer materials. Further embodiments are directed to synthetic methods for preparing the vitrimer materials and to articles including the vitrimer materials as structural components.

In example embodiments, a vitrimer includes a product of cross-linking a glycidyl methacrylate grafted high-density polyethylene (HDPE-g-GMA) of formula (I) with a polymacrolactone of formula (II):

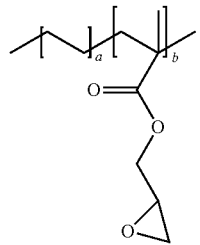
(I)

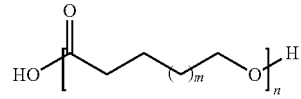
(II)

In formula (I), a and b are mole fractions of ethylene monomers and glycidyl methacrylate-grafted ethylene monomers in the HDPE-g-GMA; a is from 0.60 to 0.75; b is from 0.25 to 0.40; and $a+b \leq 1$. In formula (II), m is from 7 to 23; and n is from 5 to 50.

In further example embodiments, methods for preparing a vitrimer according to embodiments of this disclosure include reacting a glycidyl methacrylate grafted high-density polyethylene of formula (I) with a polymacrolactone of formula (II) in the presence of a first catalyst under conditions that initiate cross-linking of HDPE-g-GMA with the polymacrolactone.

In further example embodiments, mechanically reprocessable articles include a structural element. The structural element is or includes a vitrimer according to an embodiment of this disclosure.

These and other features, aspects, and advantages of the present disclosure will be better understood with reference to the following description and the appended claims.

Additional features and advantages of the embodiments described herein will be set forth in the detailed description that follows, and in part will be readily apparent to those skilled in the art from that description or recognized by practicing the embodiments described herein, including the detailed description that follows, including the claims.

DETAILED DESCRIPTION

The present application generally relates to vitrimers, articles made from vitrimers, and methods of making vitrimers. The vitrimers of the present disclosure are believed to possess the qualities of strength, recyclability, reprocessability, and self-healing. These properties are believed to make the vitrimers particularly useful for the production of articles which include structural members, such as pallets. Pallets tend to experience high loadings which cause cracking and failure. The production and disposal of polymer based pallets generates environmental challenges, especially since traditional polymer based pallets are generally not repairable. Accordingly, the creation of repairable and reprocessable polymer pallets is highly desirable.

The term "vitrimer" describes a class of polymers that flow like liquids at temperatures above a glass-transition temperature but behave as thermosets below the glass-transition temperature. Vitrimers are constructed from covalent networks that change topology by thermally activated bond-exchange reactions. These properties enable self-healing, recycling, and mechanical re-processing at a wide temperature range.

As used herein, "HDPE-g-GMA" refers to a copolymer of high-density polyethylene with monomers including a grafted glycidyl methacrylate. HDPE-g-GMA may be an alternating copolymer, a random copolymer, a periodic copolymer, a statistical copolymer, or a block copolymer. In some embodiments of this disclosure, HDPE-g-GMA is a random copolymer.

Vitrimers according to various non-limiting embodiments will now be described. A vitrimer according to embodiments may include a product of cross-linking a glycidyl methacrylate grafted high-density polyethylene (HDPE-g-GMA) of formula (I) with a polymacrolactone of formula (II):

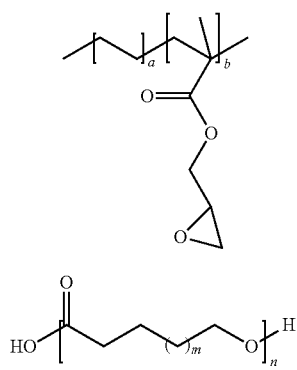

In formula (I), subscript a is a mole fraction of ethylene monomers, and subscript b is a mole fraction of glycidyl methacrylate-grafted ethylene monomers in the HDPE-g-GMA. Thus, the sum of subscript a and subscript b must be less than or equal to one. In embodiments, subscript a may be from 0.60 to 0.95, or from 0.60 to 0.90, or from 0.60 to 0.85, or from 0.60 to 0.80, or from 0.60 to 0.75, for example. In embodiments, subscript b may be from 0.05 to 0.40, or from 0.10 to 0.40, or from 0.15 to 0.40, or from 0.20 to 0.40, or from 0.25 to 0.40, for example. Without being limited by theory, it is believed that the value of b, in conjunction with the quantity of polymacrolactone added, affects the degree of cross-linking in the final product.

In some embodiments, a+b=1, whereby the vitrimer consists of only ethylene monomers and glycidyl methacrylate-grafted ethylene monomers. It should be understood that in embodiments for which a+b are less than one, that the vitrimer may include other monomers. According to further embodiments, $0.8 < a+b \leq 1$, or $0.85 < a+b \leq 1$, or $0.9 < a+b \leq 1$, or $0.95 < a+b \leq 1$, or $0.99 < a+b \leq 1$, or $0.999 < a+b \leq 1$. In some embodiments, to prepare a HDPE-g-GMA of formula (I), 100 parts by weight (pbw) HDPE are combined with from 0.25 pbw to 0.5 pbw initiator and from 1 pbw to 8 pbw glycidyl methacrylate to form a mixture. The mixture is reacted for a reaction time sufficient to copolymerize the HDPE and the glycidyl methacrylate. The reaction time may be from 1 minute to 60 minutes, or from 1 minute to 30 minutes, or from 5 minutes to 30 minutes, or from 5 minutes to 20 minutes, or from 5 minutes to 10 minutes, for example.

In the polymacrolactone according to formula (II), the subscript m defines a length of a carbon chain in the polymacrolactone units. The length of the carbon chain in the polymacrolactone units further defines a length of cross-linking portions of the vitrimer between HPDE backbones. In embodiments, m is from 7 to 23. For example, m may be from 10 to 23, from 12 to 23, from 14 to 23, from 16 to 23, from 18 to 23, from 20 to 23, from 7 to 10, from 7 to 12, from 7 to 14, from 7 to 16, from 7 to 18, from 7 to 20, from 10 to 20, from 10 to 15, from 10 to 12, from 12 to 18, or from 14 to 16, or any subset thereof. It should be understood that if polymacrolactone monomeric units of differing lengths are included in the vitrimer, the subscript m represents an average value for all polymacrolactone monomeric units. Without intent to be bound by theory, it is believed that the greater the number of carbon atoms on the polymacrolactone monomer unit, the more closely the cross-linking portion resembles the polyethylene matrix and, therefore, the more homogeneous the final polymer composition may be.

In the polymacrolactone according to formula (II), the subscript n indicates a number of repeating monomeric units within the polymacrolactone. In some embodiments, subscript n may be from 1 to 100 or from 5 to 50. As further examples, subscript n may be from 1 to 100, from 2 to 100, from 5 to 100, from 10 to 100, from 1 to 50, from 2 to 50, from 5 to 50, from 10 to 50, from 10 to 40, from 10 to 30, from 20 to 30, or any subset thereof. In embodiments, the polymacrolactone of formula (II) may have a weight-average molecular weight from 180 g/mol to 20,000 g/mol, or from 900 g/mol to 10,000 g/mol, or any subset of either range.

The HDPE-g-GMA of formula (I) may have a molecular weight from 10,000 g/mol to 100,000 g/mol. The HDPE-g-GMA may have a glass transition temperature from 20° C. to 170° C., as measured by DSC. The HDPE-g-GMA may have a melting point from 100° C. to 170° C., as measured according to ASTM D3418. The HDPE-g-GMA may have from 50% to 66% crystallinity, as measured according to ASTM F2625.

The polymacrolactone of formula (II) may have a molecular weight from 150 g/mol to 10,000 g/mol. The polymacrolactone may have a glass transition temperature from −10° C. to −120° C. as measured by DSC, a melting point from 80° C. to 95° C. as measured according to ASTM D3418, and from 30% to 40% crystallinity as measured according to ASTM F2625.

One limiting factor in the ratio of cross-linking agent to HDPE may include differences in physical properties between the cross-linking agent and the HDPE. Polymacrolactones may be preferred over other cross-linking agents owing to the similarity of the physical properties of polymacrolactones and HDPE. This similarity is believed to allow relatively high molar ratios of the polymacrolactone compared to the molar ratios achievable with other cross-linking agents. When incorporated as cross-linkers, polymacrolactones contribute structural elements to the final copolymer that resemble the polyethylene chains. Thereby, the polymacrolactone cross-linkers provide a more uniform copolymer, compared to other cross-linkers that include pendant functionalities, for example.

The vitrimers according to embodiments may have a molar ratio of the HDPE-g-GMA of formula (I) to the polymacrolactone of formula (II) that correlates to a degree of cross-linking in the vitrimer. In embodiments, the molar ratio of the HDPE-g-GMA of formula (I) to the polymacrolactone of formula (II) may range from 10:1 to 10,000:1. In further example embodiments, the molar ratio of the HDPE-g-GMA of formula (I) to the polymacrolactone of formula (II) may be from 100:1 to 10,000:1, or from 100:1 to 5000:1, or from 100:1 to 1000:1, or from 200:1 to 1000:1. A greater ratio of HDPE-g-GMA to polymacrolactone indicates a lesser degree of cross-linking in the vitrimer. In example embodiments, vitrimer may be from 0.1% to 0.5% cross-linked. In this sense the degree of cross-linking refers to an average ratio of cross-linked monomer units to total monomer units in the vitrimer. Cross-linked monomer units are units in individual HDPE backbones of the vitrimer that are cross-linked through a polymacrolactone cross-linking group to another HDPE backbone of the vitrimer. Total monomer units include the cross-linked monomer units and any other monomer unit in the vitrimer. In some embodiments, the total monomer units consist of the cross-linked monomer units and polyethylene monomer units.

The vitrimers according to embodiments may have a glass transition temperature from 20° C. to 170° C., as measured by differential scanning calorimetry (DSC). The vitrimer may have a melting point from 100° C. to 170° C., as measured according to ASTM D3418. The vitrimer may have an elongation at break from 430% to 680%, as measured according to ASTM D638. The vitrimer may have a tensile strength at break of 6.06 MPa to 6.6 MPa, as measured according to ASTM D638. The vitrimer may have from 40% to 55% crystallinity, as measured according to ASTM F2625.

The vitrimers according to embodiments are believed to be particularly suitable for mechanical reprocessing into new objects. To determine the suitability for mechanical reprocessing, it is often necessary to subject the vitrimer to a simulated reprocessing step. The simulated reprocessing step is to grind a sample of the vitrimer to a fine powder, then hot press it at 160° C. and 5 MPa. The properties of the newly formed article may then be compared with a sample which has not been subjected to the simulated reprocessing.

The vitrimers according to embodiments may experience less than a 10% change in glass transition temperature ($T_g$) upon exposure to the simulated reprocessing step. For example, upon exposure to the simulated reprocessing step, the vitrimer may experience less than a 9%, less than an 8%, less than a 7%, less than a 6%, less than a 5%, less than a 4%, less than a 3%, less than a 2%, or even less than a 1% change in $T_g$. The $T_g$ may be determined according to ASTM D3418.

The vitrimers according to embodiments may experience less than 10% change in tensile strength upon exposure to the simulated reprocessing step. For example, upon exposure to the simulated reprocessing step, the vitrimer may experience less than a 9%, less than an 8%, less than a 7%, less than a 6%, less than a 5%, less than a 4%, less than a 3%, less than a 2%, or even less than a 1% change in tensile strength. The tensile strength may be determined according to ASTM D638.

The vitrimers according to embodiments may experience less than a 10% change in elongation at yield upon exposure to the simulated reprocessing step. For example, upon exposure to the simulated reprocessing step, the vitrimer may experience less than a 9%, less than an 8%, less than a 7%, less than a 6%, less than a 5%, less than a 4%, less than a 3%, less than a 2%, or even less than a 1% change in elongation at yield. The elongation at yield may be determined according to ASTM D638.

The vitrimers according to embodiments may experience a change in opacity of less than 10% upon exposure to the simulated reprocessing step. For example, upon exposure to the simulated reprocessing step, the vitrimer may experience a change in opacity of less than 9%, less than 8%, less than 7%, less than 6%, less than 5%, less than 4%, less than 3%, less than 2%, or less than 1%. The opacity may be determined according to ASTM D1746.

The vitrimers according to embodiments may have a chemical or mechanical stability consistent with an ability to mechanically reprocess the vitrimers at elevated temperatures such as 200° C. Annealing of the vitrimers at 200° C.

for 4 hours may result in no change to the $^{13}C$ NMR spectrum, thereby evidencing no deterioration of the chemical structure of the vitrimers during the annealing.

Having previously described the vitrimers, methods for preparing the vitrimers will now be described. Example methods for preparing vitrimers of the present disclosure may include reacting a glycidyl methacrylate grafted high-density polyethylene of formula (I) with a polymacrolactone of formula (II) in the presence of a first catalyst under conditions that initiate cross-linking of HDPE-g-GMA with the polymacrolactone. The glycidyl methacrylate grafted high-density polyethylene of formula (I) and the polymacrolactone of formula (II) have been described previously with respect to the vitrimers themselves.

The first catalyst may be any catalyst capable of initiating a reaction on the glycidyl group, such as a strong base. According to some embodiments, the catalyst may include a phosphazene. For example, the catalyst may include 1-tert-Butyl-2,2,4,4,4-pentakis(dimethylamino)-2$\lambda^5$,4$\lambda^5$-catenadi(phosphazene) (also referred to as "t-BuP$_2$"), 1-tert-Butyl-4,4,4-tris(dimethylamino)-2,2-bis[tris(dimethylamino)-phosphoranylidenamino]-2$\lambda^5$,4$\lambda^5$-catenadi (phosphazene) (also referred to as "t-BuP$_4$), or a mixture thereof.

Reacting the HDPE-g-GMA with the polymacrolactone may take place in the presence of a solvent such as toluene or tetrahydrofuran (THF) or, alternatively, may take place in the absence of a solvent. In an example reaction without a solvent, a melt of HDPE-g-GMA may be prepared and polymacrolactone may be mixed in. Forgoing the use of a solvent eliminates the need to remove solvent after the reaction is complete and prevents the solvent from participating in the reaction.

Reacting the HDPE-g-GMA with the polymacrolactone may be performed at a temperature of from 90° C. to 200° C. under air or inert atmosphere. Reacting the HDPE-g-GMA with the polymacrolactone may be performed in a mixing device. The mixing device may be a high-shear mixing device, such as an extruder. For example, the mixing device may be a single-screw extruder, a twin-screw extruder, or a die extruder. Alternatively, the mixing device may be a static mixer, a dynamic mixer, or an agitator.

In one exemplary procedure, the HDPE-g-GMA is melted for five minutes at 180° C. in a twin-screw extruder. The polymacrolactone is then gradually added to the extruder. The twin-screw extruder may function as both a mixer and a reactor. Thus, the HDPE-g-GMA may be mixed and reacted with the polymacrolactone to create the vitrimer.

The methods for preparing the vitrimers may further include preparing the polymacrolactone of formula (II) before reacting the polymacrolactone with the HDPE-g-GMA. In embodiments, the polymacrolactone may be prepared by a ring-opening polymerization of a macrolactone of formula (III):

In formula (III), subscript m is from 7 to 23 and corresponds to subscript m in formula (II). The preparation of the polymacrolactone may be conducted in the presence of an initiator and a second catalyst under conditions that initiate ring-opening polymerization to form the polymacrolactone of formula (II).

Non-limiting examples of the starting macrolactone compounds with differing values of subscript m that are polymerized to form the polymacrolactone include the following:

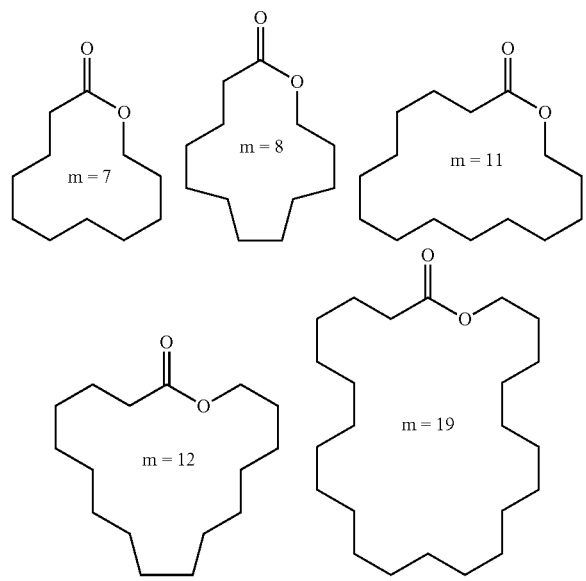

In the methods for preparing the vitrimers, the initiator may be a free radical initiator, used to enable a polymer to form by the successive addition of free-radical building blocks. The initiator may include a diol such as ethylene glycol or a peroxide such as benzoyl peroxide.

In the methods for preparing the vitrimers, the second catalyst may include a strong base. For example, the second catalyst may include a phosphazene, such as, 1-tert-Butyl-2,2,4,4,4-pentakis(dimethylamino)-2$\lambda^5$,4$\lambda^5$-catenadi(phosphazene) (also referred to as "t-BuP$_2$"), 1-tert-Butyl-4,4,4-tris(dimethylamino)-2,2-bis[tris(dimethylamino)-phosphoranylidenamino]-2$\lambda^5$,4$\lambda^5$-catenadi(phosphazene) (also referred to as "t-BuP$_4$"), or a mixture thereof. The second catalyst may be the same as or different from the first catalyst.

In the methods for preparing the vitrimers, conditions that initiate ring-opening polymerization to form the polymacrolactone may include a temperature of from 90° C. to 120° C. and a residence time of 20 min to 60 min. The reaction optionally may be conducted in the presence of a solvent such as toluene.

According to one exemplary procedure, a polymacrolactone of formula (II) is prepared from pentadecalactone, a macrolactone of formula (III) for which subscript m is 11. The pentadecalactone is reacted with alcohol initiator and phosphazene catalyst. The reaction is conducted in an inert atmosphere and in toluene solvent at a temperature of 100° C.

Having described the vitrimers and methods for their preparation, mechanically reprocessable articles including the vitrimer will now be described. According to embodiments, a mechanically reprocessable article may include a structural element including one or more of the vitrimers of this disclosure as a structural element. In one specific non-limiting embodiment, the mechanically reprocessable article may be a pallet suitable for supporting loads of goods stacked on a surface of the pallet. In some embodiments, the structural element may include a molded structure formed from the vitrimer and configured to support a load of at least 1000 kg without bending.

Vitrimers of the present disclosure may be particularly useful in structural elements that in common use are subjected to repeated loading and bending forces. Such structural elements may include any shape such as beams, columns, cylinders, spheres, bracing, planks, or boards. Such structural elements may also include alternate shapes such as monocoque structures, semi-monocoque structures, triangular structures, pentagonal structures, for example.

In example embodiments, the mechanically reprocessable article may be a pallet or a skid, of which a vitrimer according to embodiments of this disclosure form a structural element. In some embodiments, the mechanically reprocessable article may be a pallet or a skid formed entirely from a vitrimer according to embodiments of this disclosure. Pallets include any flat transport structure designed to support goods and be lifted with a forklift, pallet jack, front loader, or crane. Pallets that include a vitrimer according to the present disclosure may be capable of supporting a load greater than 1000 kg. Pallets that include a vitrimer according to the present disclosure may include two-way pallets such as the standard GMA pallet and four-way pallets which are lifted by the stringers. Pallets that include a vitrimer according to the present disclosure may include traditional board and stringer pallets. Pallets that include a vitrimer according to the present disclosure may also include alternative pallet designs such as automotive pallets, dairy pallets, international 1067 pallets, nine legged pallets, and drum pallets.

Vitrimers of the present disclosure may be formed directly into pallets by any known techniques suitable for forming polymer-based industrial pallets. For example, the vitrimers of the present disclosure may be formed directly into pallets by injection molding of the vitrimer, structural foam molding of the vitrimer, thermoforming of the vitrimer, compression molding of the vitrimer, rotational molding of the vitrimer, or profile extrusion of the vitrimer. Alternatively, vitrimers of the present disclosure may be formed into structural elements and combined into a pallet using fasteners, glues, epoxies, welding, or soldering.

Although the concepts of the present disclosure are described herein with primary reference to HDPE-g-GMA cross-linked with polymacrolactones, it is contemplated that the concepts will be broadly applicable to other known HDPE-based vitrimers. In this sense, embodiments of this disclosure include articles such as pallets that include or are entirely formed from an HDPE-based vitrimer.

Items Listing

Embodiments of the present disclosure include at least following items, which are not intended to limit the scope of the disclosure as a whole or of the appended claims.

Item 1: A vitrimer comprising a product of cross-linking a glycidyl methacrylate grafted high-density polyethylene (HDPE-g-GMA) of formula (I) as previously described with a polymacrolactone of formula (II) as previously described, where: a and b are mole fractions of ethylene monomers and glycidyl methacrylate-grafted ethylene monomers in the HDPE-g-GMA; a is from 0.60 to 0.75; b is from 0.25 to 0.40; a+b≤1; m is from 7 to 23; and n is from 5 to 50.

Item 2: The vitrimer of Item 1, wherein a+b=1.

Item 3: The vitrimer of any of the preceding Items, wherein the HDPE-g-GMA has a molecular weight from 10,000 g/mol to 100,000 g/mol.

Item 4: The vitrimer of any of the preceding Items, wherein the polymacrolactone has a molecular weight from 900 g/mol to 10,000 g/mol.

Item 5: The vitrimer of any of the preceding Items, wherein the vitrimer has a molecular weight from 10,000 g/mol to 100,000 g/mol.

Item 6: The vitrimer of any of the preceding Items, wherein the vitrimer is from 0.1% to 0.5% cross-linked.

Item 7: The vitrimer of any of the preceding Items, wherein m is 11.

Item 8: A method for preparing a vitrimer according to any of the preceding Items, the method comprising: reacting a glycidyl methacrylate grafted high-density polyethylene of formula (I) as previously described with a polymacrolactone of formula (II) as previously described in the presence of a first catalyst under conditions that initiate cross-linking of HDPE-g-GMA with the polymacrolactone.

Item 9: The method of Item 8, wherein the catalyst is a phosphazene.

Item 10: The method of Item 8 or Item 9, wherein the catalyst comprises 1-tert-Butyl-2,2,4,4,4-pentakis(dimethylamino)-$2\lambda^5,4\lambda^5$-catenadi(phosphazene), 1-tert-Butyl-4,4,4-tris(dimethylamino)-2,2-bis[tris(dimethylamino)-phosphoranylidenamino]-$2\lambda^5,4\lambda^5$-catenadi(phosphazene), or a mixture thereof.

Item 11: The method of any of Items 8 to 10, wherein the reacting is performed in the absence of a solvent.

Item 12: The method of any of Items 8 to 11, wherein the reacting is performed at a temperature of from 150° C. to 180° C.

Item 13: The method of any of Items 8 to 12, wherein the reacting is performed in a mixing device.

Item 14: The method of any of Items 8 to 13, further comprising polymerizing a macrolactone of formula (III) as previously described, where m is from 7 to 23, in the presence of an initiator and a second catalyst under conditions that initiate ring-opening polymerization to form the polymacrolactone of formula (II) as previously described.

Item 15: The method of any of Items 8 to 14, wherein the polymerizing is performed at a temperature of from 90° C. to 110° C.

Item 16: The method of any of Items 8 to 15, wherein the initiator is a diol.

Item 17: A mechanically reprocessable article comprising a structural element, the structural element comprising the vitrimer according to Item 1.

Item 18: The mechanically reprocessable article of Item 17, wherein the article is a pallet.

Item 19: The mechanically reprocessable article of Item 17 or 18, wherein the structural element comprises a molded structure formed from the vitrimer and configured to support a load of at least 1000 kg without bending.

It is also noted that recitations herein of "at least one" component, element, etc., should not be used to create an inference that the alternative use of the articles "a" or "an" should be limited to a single component, element, etc.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims include the term "wherein" as a transitional phrase. For the purposes of defining the present invention, it is noted that "wherein" is introduced in the claims as an open-ended transitional phrase for reciting a series of characteristics of the structure and should be interpreted in like manner as the commonly used open-ended preamble term "comprising."

What is claimed is:

1. A vitrimer comprising a product of cross-linking a glycidyl methacrylate grafted high-density polyethylene (HDPE-g-GMA) of formula (I) with a polymacrolactone of formula (II):

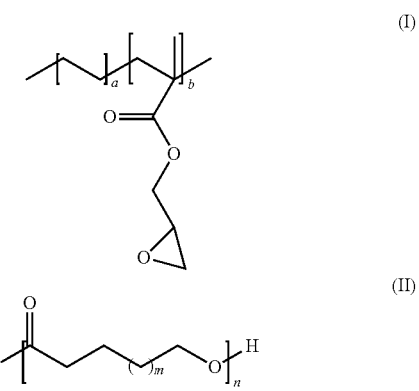

where:
a and b are mole fractions of ethylene monomers and glycidyl methacrylate-grafted ethylene monomers in the HDPE-g-GMA;
a is from 0.60 to 0.75;
b is from 0.25 to 0.40;
a+b≤1;
m is from 7 to 23; and
n is from 5 to 50.

2. The vitrimer of claim 1, wherein a+b=1.

3. The vitrimer of claim 1, wherein the HDPE-g-GMA has a molecular weight from 10,000 g/mol to 100,000 g/mol.

4. The vitrimer of claim 1, wherein the polymacrolactone has a molecular weight from 900 g/mol to 10,000 g/mol.

5. The vitrimer of claim 1, wherein the vitrimer has a molecular weight from 10,000 g/mol to 100,000 g/mol.

6. The vitrimer of claim 1, wherein the vitrimer is from 0.1% to 0.5% cross-linked.

7. The vitrimer of claim 1, wherein m is 11.

8. A method for preparing a vitrimer according to claim 1, the method comprising:
reacting a glycidyl methacrylate grafted high-density polyethylene of formula (I) with a polymacrolactone of formula (II) in the presence of a first catalyst under conditions that initiate cross-linking of HDPE-g-GMA with the polymacrolactone.

9. The method of claim 8, wherein the catalyst is a phosphazene.

10. The method of claim 8, wherein the catalyst comprises 1-tert-Butyl-2,2,4,4,4-pentakis(dimethylamino)-$2\lambda^5,4\lambda^5$-catenadi(phosphazene), 1-tert-Butyl-4,4,4-tris(dimethylamino)-2,2-bis[tris(dimethylamino)-phosphoranylide-namino]-2λ⁵,4λ⁵-catenadi(phosphazene), or a mixture thereof.

11. The method of claim 8, wherein the reacting is performed in the absence of a solvent.

12. The method of claim 8, wherein the reacting is performed at a temperature of from 150° C. to 180° C.

13. The method of claim 8, wherein the reacting is performed in a mixing device.

14. The method of claim 8, further comprising: polymerizing a macrolactone of formula (III):

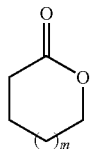

(III)

where m is from 7 to 23, in the presence of an initiator and a second catalyst under conditions that initiate ring-opening polymerization to form the polymacrolactone of formula (II).

15. The method of claim 14, wherein the polymerizing is performed at a temperature of from 90° C. to 110° C.

16. The method of claim 14, wherein the initiator is a diol.

17. A mechanically reprocessable article comprising a structural element, the structural element comprising the vitrimer according to claim 1.

18. The mechanically reprocessable article of claim 17, wherein the article is a pallet.

19. The mechanically reprocessable article of claim 18, wherein the structural element comprises a molded structure formed from the vitrimer and configured to support a load of at least 1000 kg without bending.

* * * * *